United States Patent
Wang

(10) Patent No.: US 6,833,877 B2
(45) Date of Patent: Dec. 21, 2004

(54) RF CONVERTER HAVING MULTIPLE AV/S TERMINALS

(75) Inventor: Cheng-Si Wang, Changhua Hsien (TW)

(73) Assignee: Trans Electric Co., Ltd., Changhua Hsien (TW)

( * ) Notice: Subject to any disclaimer, the term of this patent is extended or adjusted under 35 U.S.C. 154(b) by 530 days.

(21) Appl. No.: 10/047,137

(22) Filed: Jan. 15, 2002

(65) Prior Publication Data

US 2003/0133046 A1 Jul. 17, 2003

(51) Int. Cl.[7] .............................................. H04N 5/268
(52) U.S. Cl. ..................... 348/705; 348/706; 348/522; 348/484; 348/724
(58) Field of Search .......................... 348/705, 706, 348/707, 722, 554, 522, 484, 485, 724, 738; 381/81, 123, 124, 686, 437; 361/686, 437; 386/95, 96, 102; 455/130, 191.3, 899

(56) References Cited

U.S. PATENT DOCUMENTS

| | | | | |
|---|---|---|---|---|
| 4,017,682 A | * | 4/1977 | Tojo ............................ 348/724 |
| 4,048,654 A | * | 9/1977 | Wegner ....................... 348/485 |
| 4,500,920 A | * | 2/1985 | Ohyama et al. ............. 348/181 |
| 4,788,590 A | * | 11/1988 | Arai ............................ 348/484 |
| 4,937,672 A | * | 6/1990 | Anderson .................... 348/554 |
| 5,305,105 A | * | 4/1994 | Heo ............................ 348/485 |
| 5,438,375 A | * | 8/1995 | Sasabe et al. ............... 348/706 |
| 6,151,067 A | * | 11/2000 | Suemoto et al. ........ 348/207.99 |
| 6,226,053 B1 | * | 5/2001 | Cho ............................ 348/705 |
| 6,473,135 B1 | * | 10/2002 | Iwamura ..................... 348/706 |

* cited by examiner

Primary Examiner—Michael H. Lee
Assistant Examiner—Jean W. Désir
(74) Attorney, Agent, or Firm—William E. Pelton, Esq.

(57) ABSTRACT

The present invention has multiple AV/S terminals, an RF modulator, a S/AV signal converter and multiple switches. The switches connect the AV/S terminals with the RF outputs to allow the AV/S signal from the special AV/S terminal input into the RF modulator to be converted to an RF-signal input to the ANT terminal of the TV. Besides, the present invention further has an ANT input with an electronic switch and a detecting unit having a driver, which decides whether the electronic switch turns on. If the detecting unit detects no AV-signal or S-signal input from the AV/S terminals, the detecting unit first cuts off the power to the RF modulator and then makes the electronic switch turn on. The RF-signal from the ANT input is output to the RF output.

5 Claims, 7 Drawing Sheets

RF CONVERTER HAVING MULTIPLE AV/S TERMINALS

BACKGROUND OF THE INVENTION

1. Field of the Invention

The present invention is related to a radio frequency (RF) converter having multiple AV/S terminals, and more particularly to an RF converter that converters one AV/S signal from one of the multiple AV/S terminals to one RF signal to input into an antenna terminal of a monitor such as a TV.

2. Description of Related Art

In the past, TV devices have an antenna (ANT) terminal to be connected to an antenna. The antenna receives the wireless signal including video and audio components and inputs the signal to the ANT terminal through a line.

As video/audio memories have developed, many kinds of video/audio players have been designed to read and play the data from the corresponding video/audio disks, such as VCD, DVD, etc. The latest video/audio players have different output terminals such as AV terminals and S terminals to transmit the video/audio data from the players to the TV where the data is presented to the viewer. If the TV is an old type, the TV can not show that data on it. Therefore the older model TVs can not adapt to the present video/audio players.

To connect older model TVs to the new video/audio terminal types a converter has designed. The converter connects the AV/S terminals to the ANT terminal of the TV. That is, the converter converts the AV/S signal to an RF signal and then inputs the RF signal into the ANT terminal. The converter usually provides one AV input and one RF output, so the converter can only be attached to and used with one AV player at a time. Since the converter cannot be attached to at least two AV players simultaneously, the user has to attach the two terminals of the two different AV players individually. Therefore the converter is still inconvenient to adapt to multiple AV players.

Therefore, an objective of the present invention is to provide an improved converter to simultaneously accommodate multiple AV/S terminals to mitigate and/or obviate the aforementioned problems.

SUMMARY OF THE INVENTION

The main objective of the present invention is to provide an RF converter having multiple AV/S terminals that allows lots of AV players to be simultaneously connected to the converter and then connect the selected player to the ANT terminal of the TV through the converter.

Other objectives, advantages and novel features of the invention will become more apparent from the following detailed description when taken in conjunction with the accompanying drawings.

DETAILED DESCRIPTION OF THE PREFERRED EMBODIMENT

Figure 2:
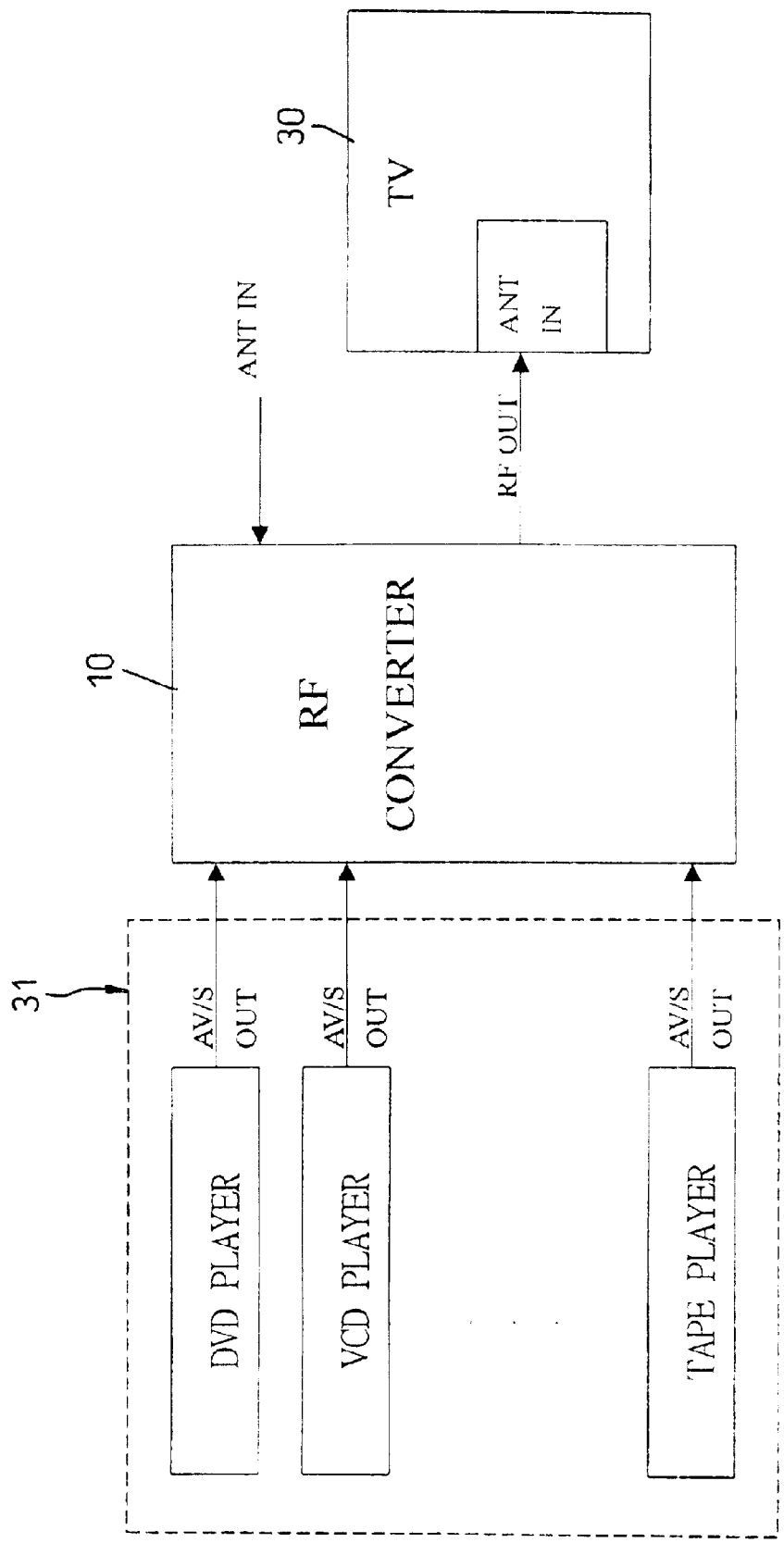
FIG. 2 shows multiple AV players connected through the converter to a TV.

With reference to FIG. 2, an RF converter (10) has multiple input ports, which are AV/S terminals and one ANT terminal, connected to corresponding AV/S output ports of AV players (31) and an output port that is an RF output port connected to an ANT input port of a TV (30).

With reference to FIGS. 1A to 1F, the RF converter (10) further comprises an RF modulator (11), an S to AV signal converting unit (13), a switching unit (12), a detecting unit (17) and a power circuit (18).

Figure 1A:
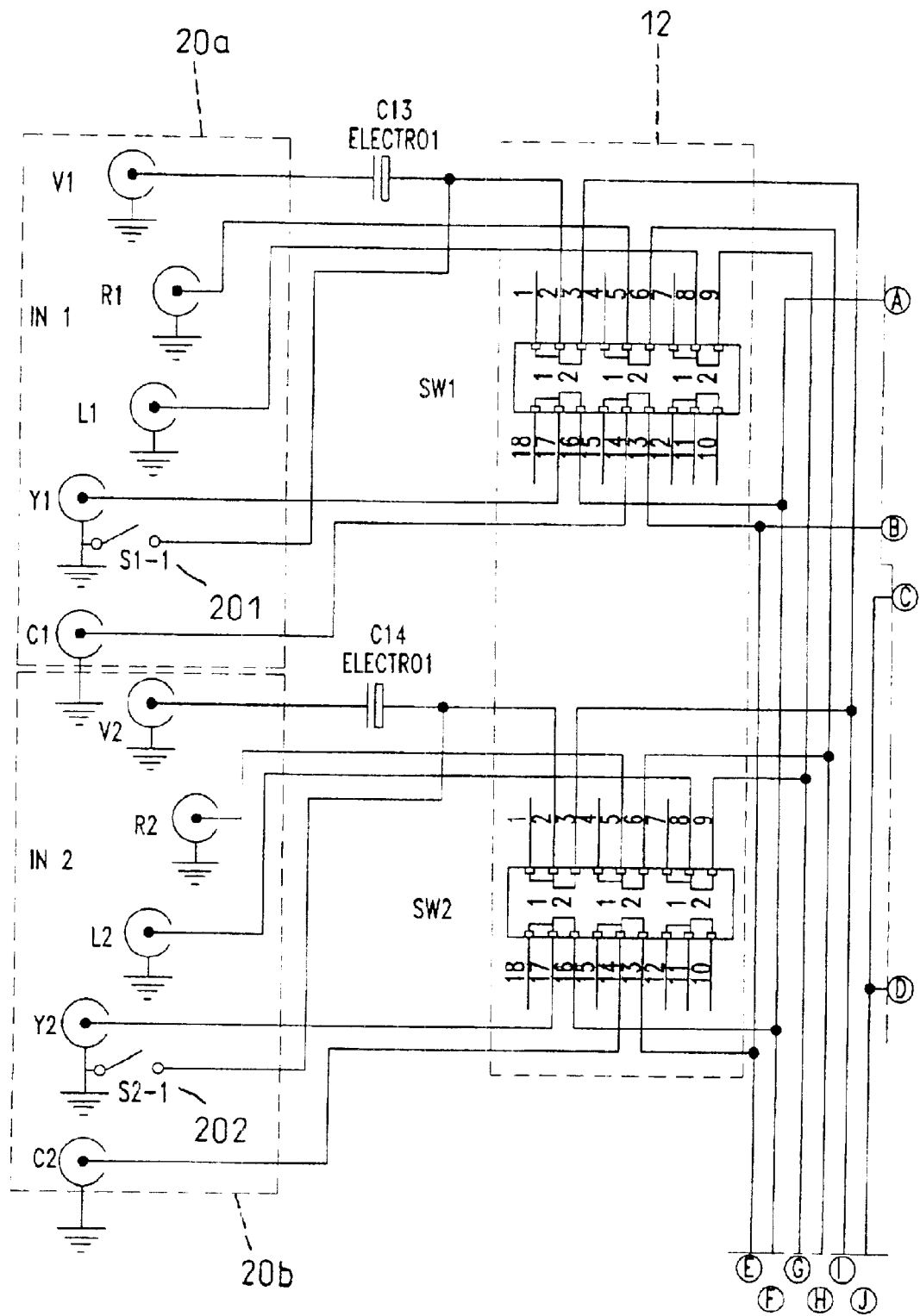
FIGS. 1A~1F are collectively the circuit diagram of a converter in accordance with the present invention.
Figure 1B:
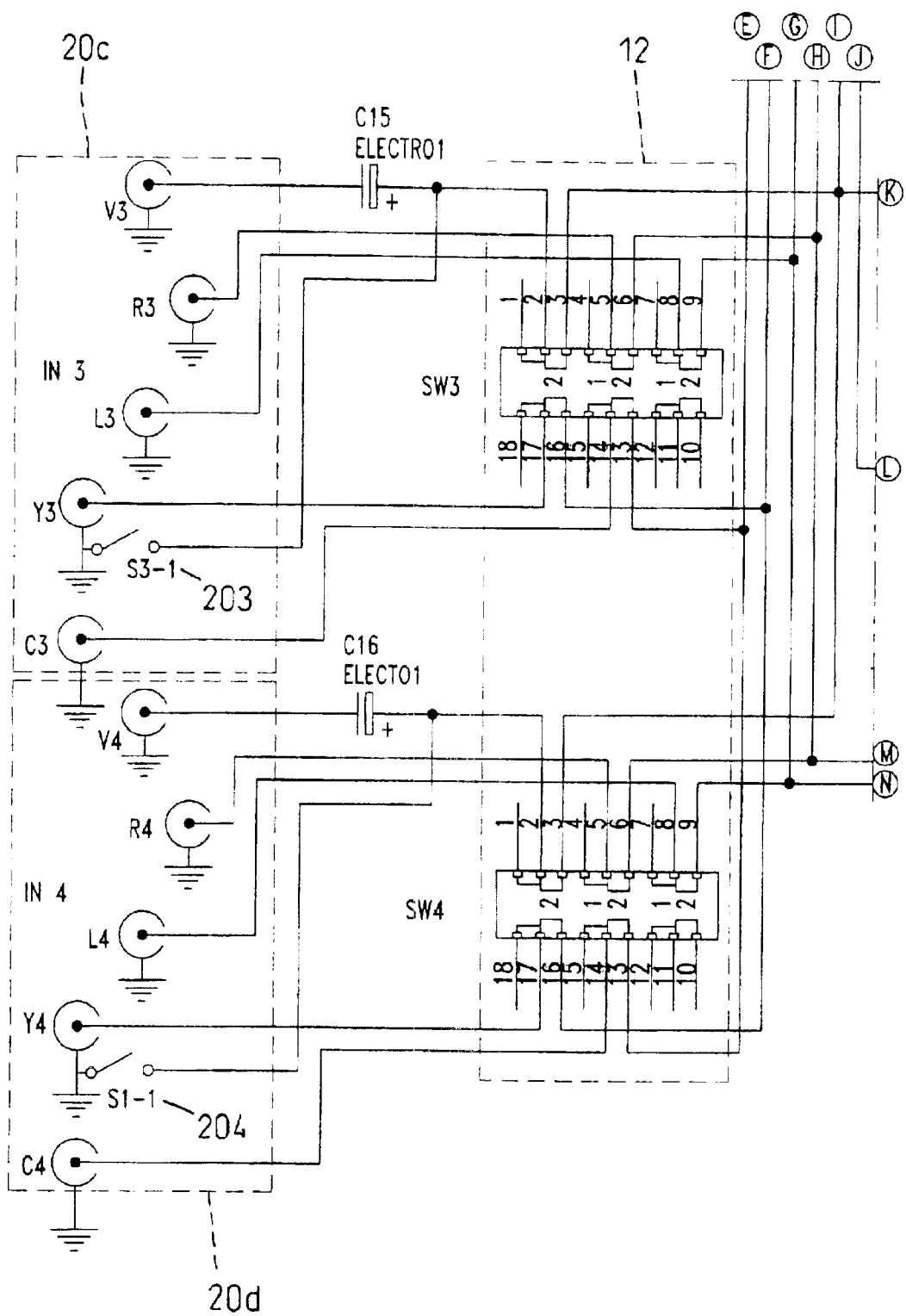
Figure 1C:
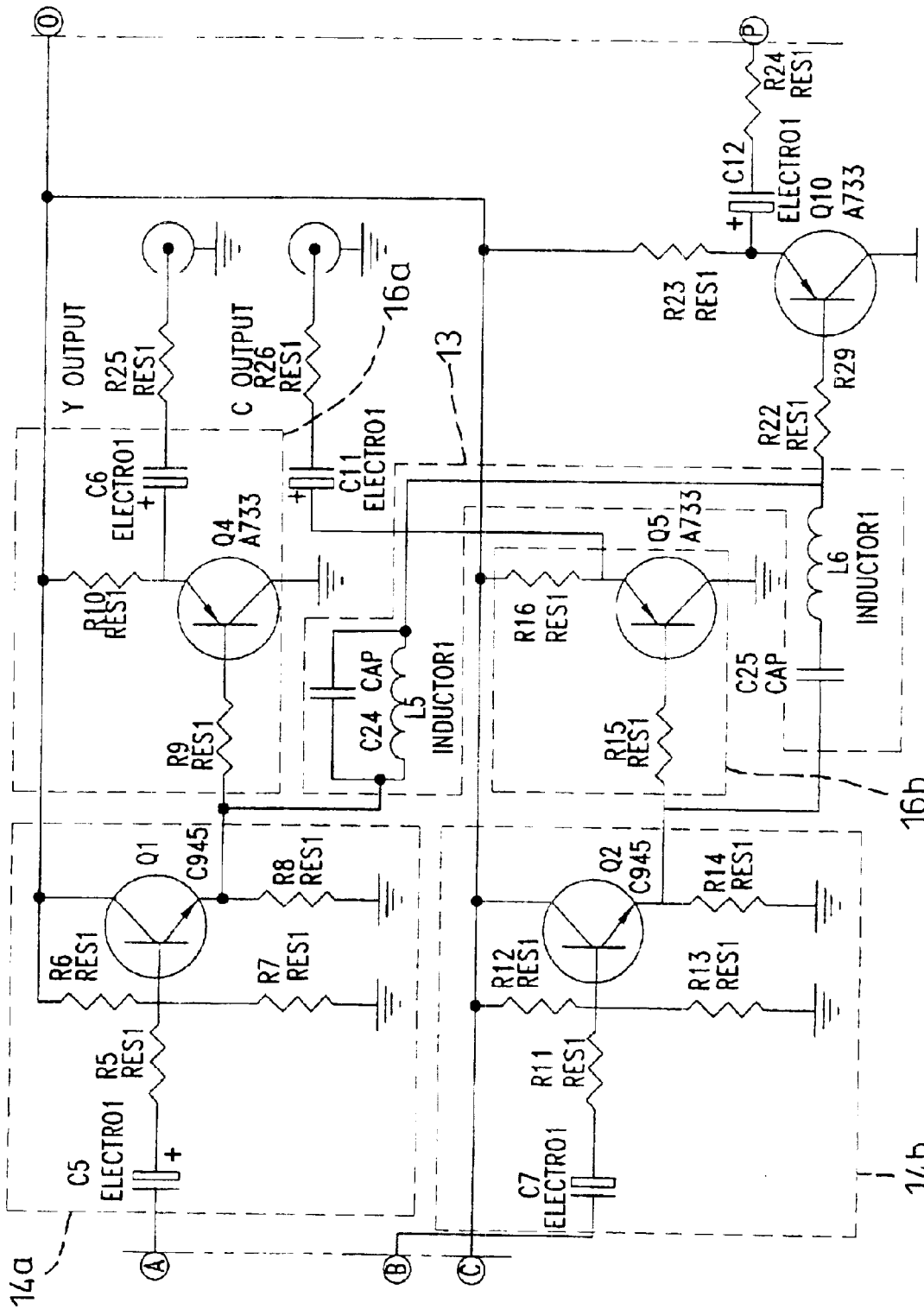
Figure 1D:
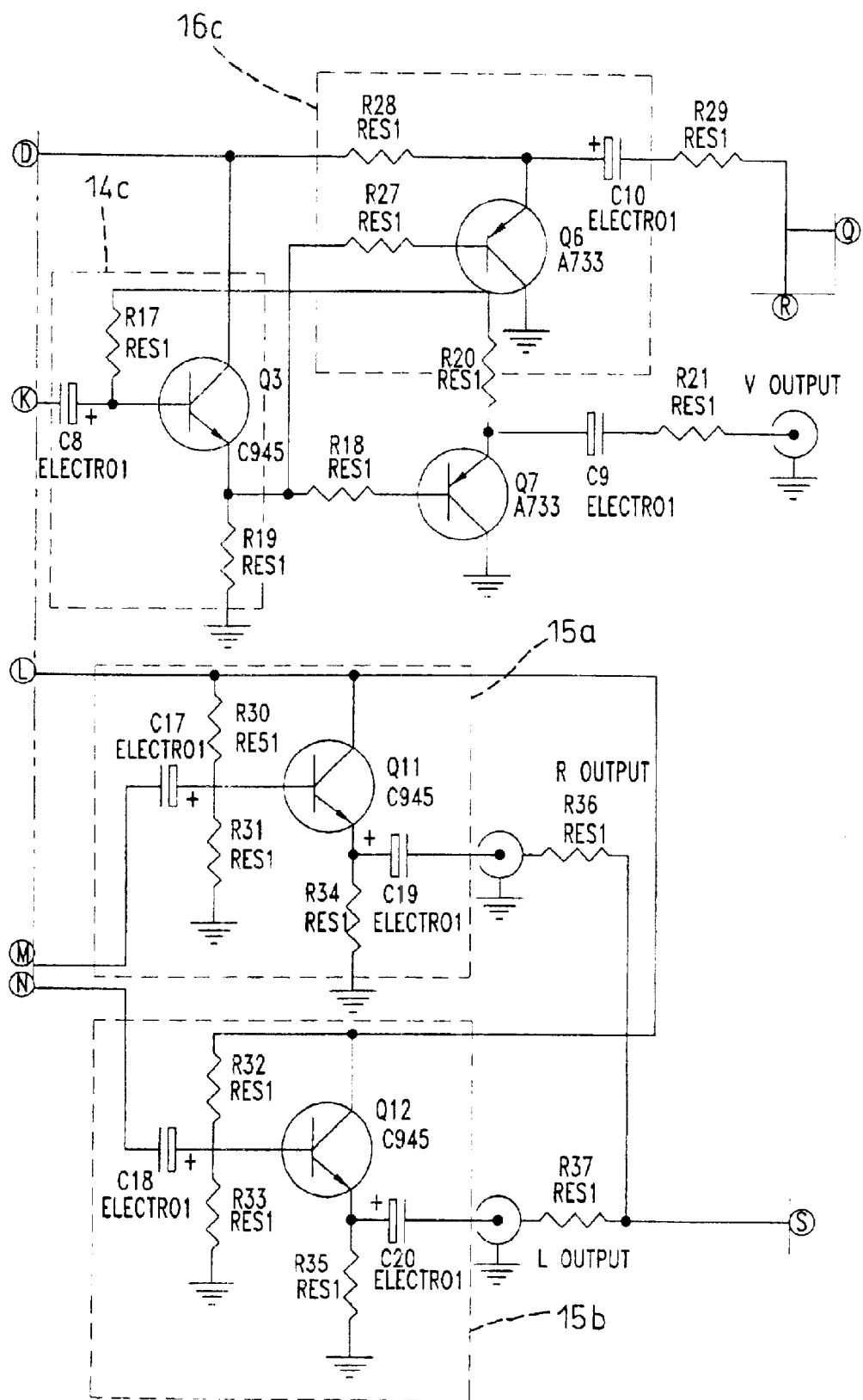
Figure 1E:
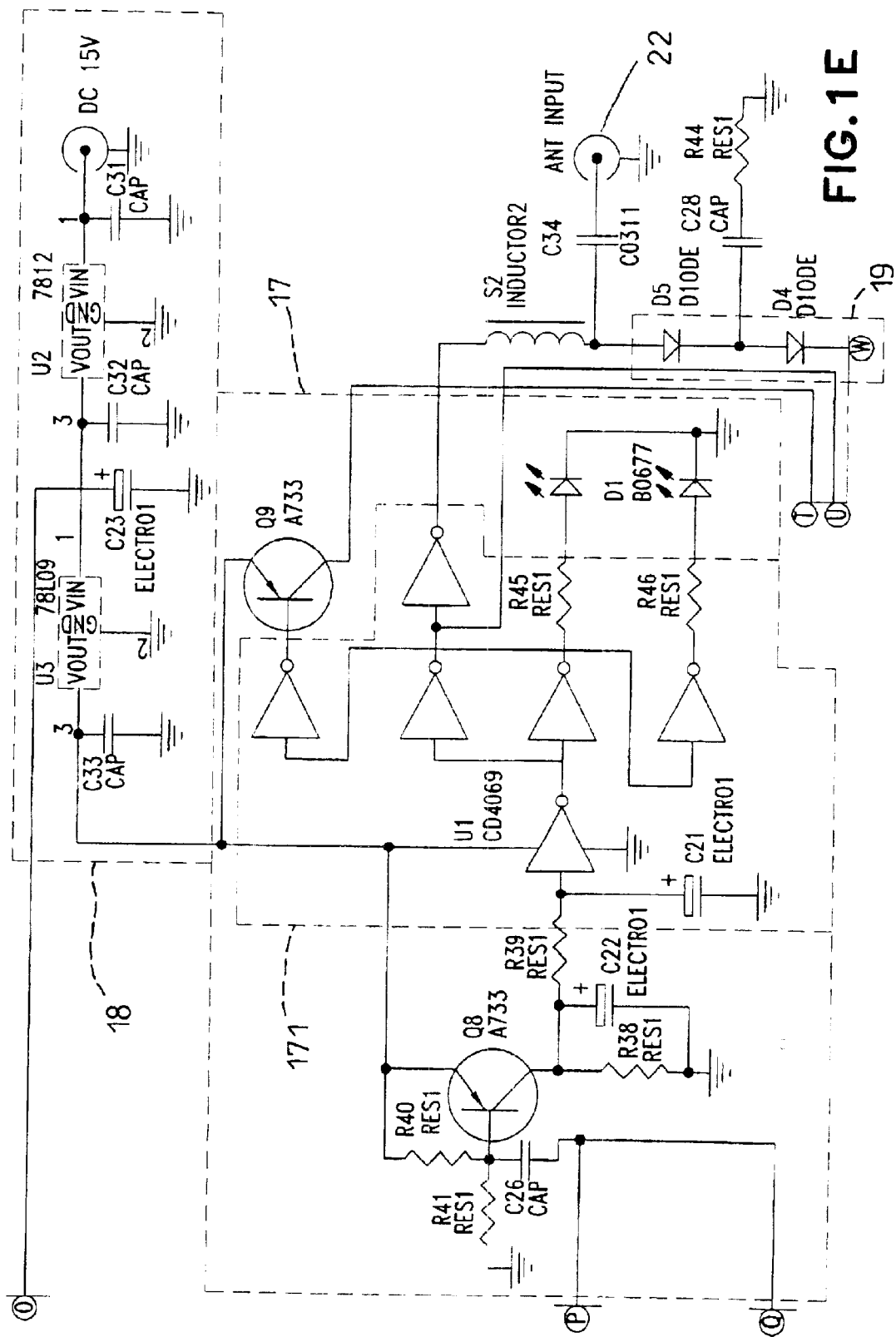
Figure 1F:
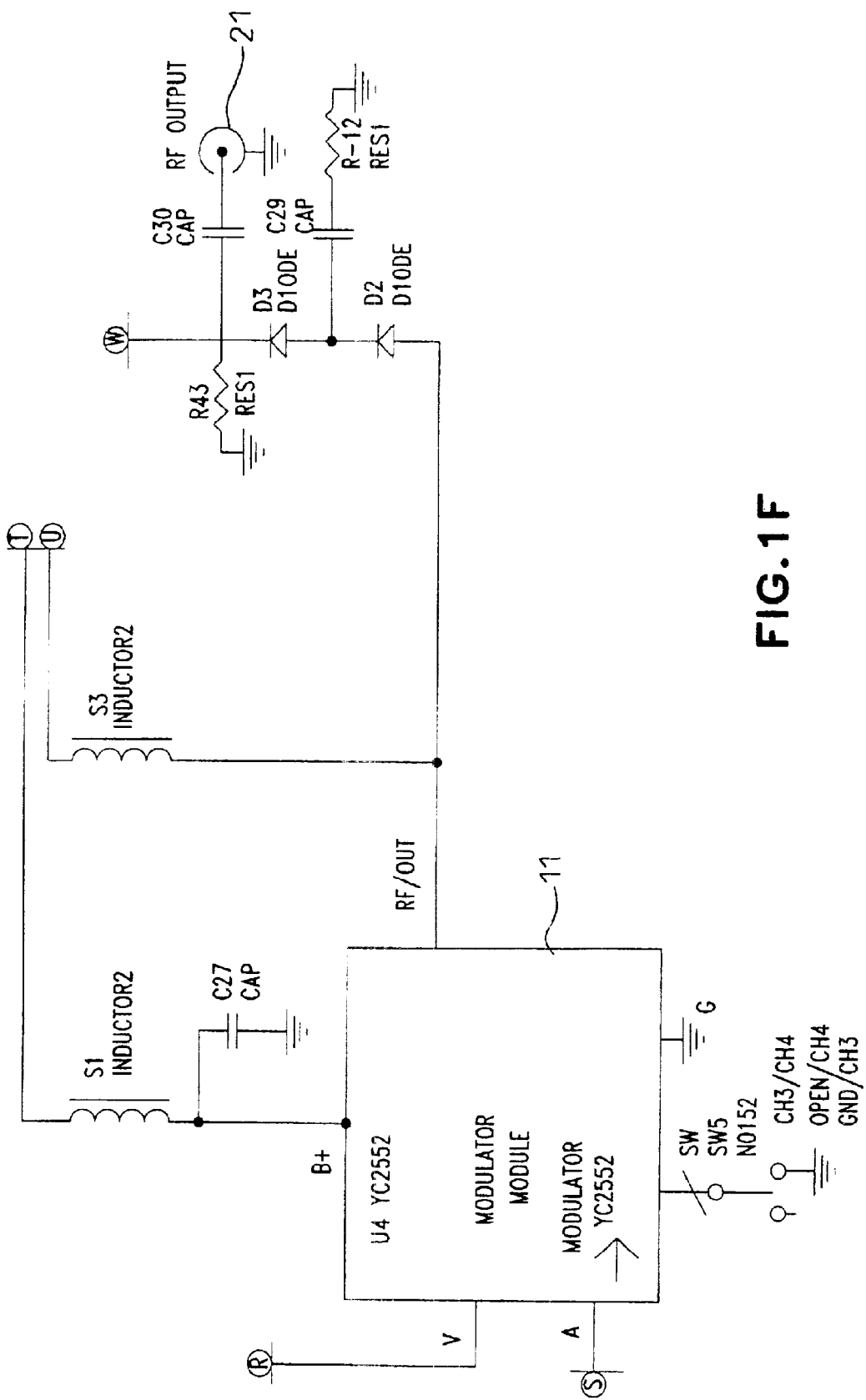

The RF modulator (11) having one video input (V), one audio input (A) and one RF output (21) convents an audio signal (A-signal) and video signal (V-signal) to an RF-signal, as shown in FIG. 1F.

With reference to FIGS. 1A, 1C, 1D, 1E and 1F, the S to AV signal converting unit (13) connected to the video input (V) of the RF modulator (11) converts an S-signal to a V-signal. The S to AV signal converting unit (13) has an RC parallel tuner C24, L5 and an RC serial tuner C25, L6. That is, an S terminal has a Y pin connected to an input of the RC parallel tuner C24, L5 and a C pin connected to an input of the RC serial tuner C25, L6. The outputs of the two tuners connect together and connect together to the video input (V) of the RF modulator (11) through a transistor Q10. Therefore, the S-signal from the S terminal is converted to a V-signal by the S to AV signal converting unit (13), and then is input to the V-pin of the RF modulator (11) through transistor Q10.

With reference to FIGS. 1A and 1B, the switching unit (12) has multiple switches SW1~SW4 connected to corresponding AV/S terminals (20a)~(20d). The switch (SW1, SW2, SW3 or SW4) selected determines which one of the AV/S terminals (20a)~(20d) is to be input to the V pin of the RF modulator (11). Each AV terminal (20a, 20b, 20c or 20d) has a V pin, an R pin and an L pin. In each of the AV/S terminals (20a)~(20d), a ground of the Y pin connects to the V pin of the AV terminal (20a, 20b, 20c or 20d) through a priority switch (201, 202, 203 or 204). Converting the S-signal from the S terminal to the RF-signal has priority over the AV-signal from the AV terminal, when both the AV terminal and the S terminals are connected to corresponding AV/S output ports of the AV player (not shown). That is, if the S output port of the AV players (not shown) connected to the S terminal by a plug, the priority switch (201)~(204) is closed, which connects the signal line of the V pin to the ground of the Y pin so any V-signal from the V pin is shorted to ground.

With reference to FIGS. 1C and 1D, each of the switches (201)~(204) connects the AV/S terminals (20a)~(20d) with the V pin and the A pin of the RF modulator. However, before the AV/S terminals (201)~(204) connect to the audio input (A) and video input (V) of the RF modulator (not shown), the Y pin and the C pin of the S terminal and the V pin of each AV terminal respectively connect to three video signal amplifiers (14a)~(14c) that in turn connect to three impedance matching units (16a)~(16b). The R and L pins of each AV terminal respectively connect to two audio signal amplifiers (15a)(15b), and the outputs of the two audio signal amplifiers (15a)(15b) connect together to the audio input (A) of the RF modulator (11), as shown the FIG. 1F.

With reference to FIGS. 1C, 1E and 1F, the detecting unit (17) is connected among the transistor Q10, a power pin (B+) of the RF modulator (11) and the ANT input (22). An electronic switch (19) is connected between the ANT input (22) and the RF output (21) to provide a direct path for an antenna signal when an ANT plug is connected to the ANT input (22). The detecting unit (17) comprises a first transistor Q8, a second transistor Q9 and a driver (171) connecting the first transistor Q8 to the electronic switch (19) of the ANT input (22). The electronic switch (19) connecting the ANT input (22) to the RF output (21) of the RF modulator (11) is two diodes (D4, D5).

Referring to FIGS. 1A~1F, when the AV/S terminals (20a)~(20d) are connected to AV players, the user uses the switching unit (12) to turn on one of the AV/S terminals (20a)~(20d) so the appropriate RF-signal is output through the RF output (21). For example, when the first switch SW1 is turned on, the V-signal from the VI pin of the first AV terminal inputs to the video signal amplifier (14c) to amplify the video signal, thereafter inputs to the video input (V) of the RF modulator (11) through the impedance matching unit (16c). Because the transistor Q1 turns on, the V-signal from the matching impedance unit (16c) inputs to the video input (V) of the RF modulator (11).

The A-signal from the R1 pin and L1 pin of the first AV terminal inputs to the audio signal amplifier (15a) (15b) to amplify the audio signal, which is thereafter input to the audio input (A) of the RF modulator (11). When the RF modulator (11) gets the A-signal and the V-signal, they are converted to the RF signal.

If the first S terminal connects to an S-signal output of an AV player (not shown), any video signal connected to the AV terminal will be shorted to ground because the priority switch (201) is connected between ground and the VI pin of the AV terminal. Consequently, the S-signal is converted to a V-signal by the S to AV signal converter (13). The transistor Q10 turns on to let the video signal input to the video input (V) of the RF modulator (11). At the same time, the first and second transistor (Q8, Q9) of the detecting unit (17) turn on, so that the power from a power circuit (18) is supplied to the RF modulator (11) through the second transistor Q9. Thereafter the video signal is converted to the RF-signal by the RF modulator (11). The present invention is able to provide multiple AV/S terminals (20a)~(20d) is able to simultaneously connect to multiple devices. Controlling the switching unit (12) determines which one of the multiple AV/S terminals (20a)~(20d) to connect to the ANT input of the TV (not shown). Besides, when none of the S terminals inputs a signal to the RF modulator (11), the transistor Q10, the first transistor Q8 and the second transistor Q9 turn off. The driver (171) outputs a high level voltage to make the electronic switch (19) turn on. Therefore the power of the power circuit (18) does not have to be supplied to the power pin (B+) of the RF modulator (10), and the RF-signal from the ANT input (22) is directly output to the RF output (21) through the electronic switch (19).

The RF converter (10) not only adapts to multiple AV/S terminals (20a)~(20b), but also has an ANT input (22) to directly connect an ANT plug. To use the present invention, the user only has to connect all AV/S output ports of the AV plays by the plugs to the corresponding AV/S terminals (20a)~(20d) of the RF converter (10). Then the user operates the switches SW1~SW4 to chose the specific switch SW1~SW4 to allow the corresponding AV-signal or S-signal from the AV/S terminal (20a)~(20d) to be converted by the RF modulator (11). Then the RF-signal is output through the RF output (21).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An RF converter having multiple AV/S terminals comprising:
   an RF modulator having a video input (V), an audioinput (A), one RF output and a power pin, wherein the RF output connects to an ANT terminal of a TV;
   an S to AV signal converter unit connected to the video input of the RF modulator to convert the S-signal to the V-signal; and
   multiple switches connected to the corresponding AV/S terminals, wherein an V pin of the each AV terminal connects to the video input of the RF modulator and a A pin of the each AV terminal connects to the audio input of the RF modulator and an S terminal having a Y pin and a C pin connects to the S to AV signal converter unit to convert an S-signal to a V-signal.

2. The RF converter as claimed in claim 1, wherein the S to AV signal converter unit comprises an RC parallel tuner connected to the Y pin of the S terminal and an RC serial tuner connected to the C pin of the S terminal, wherein an output of the RC parallel tuner connects to an output of the serial tuner and through a transistor to the video input of the RF modulator.

3. The RF converter as claimed in claim 1, wherein the RF converter between the video input of the RF modulator and the switches connected to the corresponding AV/S terminals further comprises:
   at least three video signal amplifiers connected to the V pins of the AV terminals and the Y pins and the C pins of the S terminals to amplify the video signal from the A pins, the Y pins and the C pins, wherein outputs of the video signal amplifiers connected to the S terminal connect to the S to AV signal converting unit;
   at least two audio signal amplifiers connected to the V pins of the AV terminals to amplify the audio signal from the A pins of the AV terminals;
   at least three switching impedance units connected to outputs of the video and audio signal amplifiers with the video input and the audio input of the RF modulator.

4. The RF converter as claimed in claim 2, wherein the RF converter further comprises a detecting unit, an ANT input and an electronic switch connected between the ANT input with the RF output, wherein the detecting unit connects among a power circuit supplying power to the power pin of the RF modulator, the power pin, the transistor and the ANT input has:
   a first transistor connected to the transistor;
   a second transistor connected to the first transistor; and
   a driver connected the first transistor with the electronic switch of the ANT output to decide weather the electronic switch turns on; wherein
   according to whether the transistor turns on decides the driver to allow the electronic switch to turn on, that is the RF-signal from the ANT input is directly output to the RF output of the RF modulator.

5. The RF converter as claimed in claim 1, wherein the RF converter further comprises multiple priority switches respectively connecting the grounds of the S terminals with the V pins of the AV terminals, wherein each priority switch ensures that inputting the S-signal from the S terminal input to the RF modulator has priority over the V-signal in the same AV/S terminal.

* * * * *